United States Patent [19]

Trumley et al.

[11] 4,051,626

[45] Oct. 4, 1977

[54] PORTABLE GREENHOUSE

[75] Inventors: Richard L. Trumley, Charlotte; Randy W. Linn, Eaton Rapids, both of Mich.

[73] Assignee: General Aluminum Products, Incorporated, Charlotte, Mich.

[21] Appl. No.: 688,823

[22] Filed: May 21, 1976

[51] Int. Cl.² .............................................. A01G 9/14
[52] U.S. Cl. .......................................... 47/17; 47/19; 47/69
[58] Field of Search ................ 47/17, 19, 34, 36, 38.1, 47/69

[56] References Cited

U.S. PATENT DOCUMENTS

| 95,255 | 9/1869 | Osborn | 47/17 |
|---|---|---|---|
| 1,376,998 | 5/1921 | Boss | 47/16 |
| 1,910,021 | 5/1923 | Legg | 324/65 R |
| 1,942,477 | 1/1934 | Jacobus | 47/17 |
| 2,188,875 | 1/1940 | Ellis | 47/62 |
| 2,659,180 | 11/1953 | Action | 47/81 |
| 2,681,571 | 6/1954 | Becker | 73/335 |
| 2,693,787 | 11/1954 | Morey | 119/51 |
| 2,709,838 | 6/1955 | Zausner | 47/17 |
| 2,963,819 | 12/1960 | Hoch | 47/17 |
| 3,077,053 | 2/1963 | Fried | 47/17 |
| 3,106,801 | 10/1963 | Risacher | 47/17 |
| 3,136,090 | 6/1964 | Carnwath | 47/19 |
| 3,522,732 | 8/1970 | Bauer | 73/336.5 |
| 3,536,370 | 10/1970 | Evans et al. | 47/17 X |
| 3,540,278 | 11/1970 | Diamond et al. | 73/336.5 |
| 3,603,034 | 9/1971 | Maxwell-Stewart | 47/14 X |
| 3,606,697 | 9/1971 | Eden | 47/34 X |
| 3,613,308 | 10/1971 | Klein et al. | 47/17 |
| 3,667,158 | 6/1972 | Privett | 47/17 |
| 3,673,733 | 7/1972 | Allen | 47/17 X |
| 3,946,522 | 3/1976 | Schifman | 47/36 |

FOREIGN PATENT DOCUMENTS

| 87,658 | 8/1921 | Austria | 47/38.1 |
|---|---|---|---|
| 683,296 | 11/1952 | United Kingdom | 47/14 |
| 867,118 | 5/1961 | United Kingdom | 47/14 |
| 1,225,317 | 3/1971 | United Kingdom | 47/19 |

OTHER PUBLICATIONS

Sales brochure "Plantorium," published for Laboratory Furniture Company, Inc., copyright 1964.

Primary Examiner—Edgar S. Burr
Assistant Examiner—James R. Feyrer
Attorney, Agent, or Firm—Price, Heneveld, Huizenga & Cooper

[57] ABSTRACT

A portable, self-contained greenhouse includes a base pan having longitudinally extending troughs adjacent the sides thereof and a curved bottom panel. A transparent enclosure including a plurality of slidable, transparent wall and roof panels is supported on the base pan. An automatic heating arrangement is disposed partially within the base pan for uniformly heating the soil mixture contained therein. Artificial lights and a control system are included for selectively, artificially stimulating the plants as a function of ambient lighting conditions. A moisture indicator is also provided.

16 Claims, 16 Drawing Figures

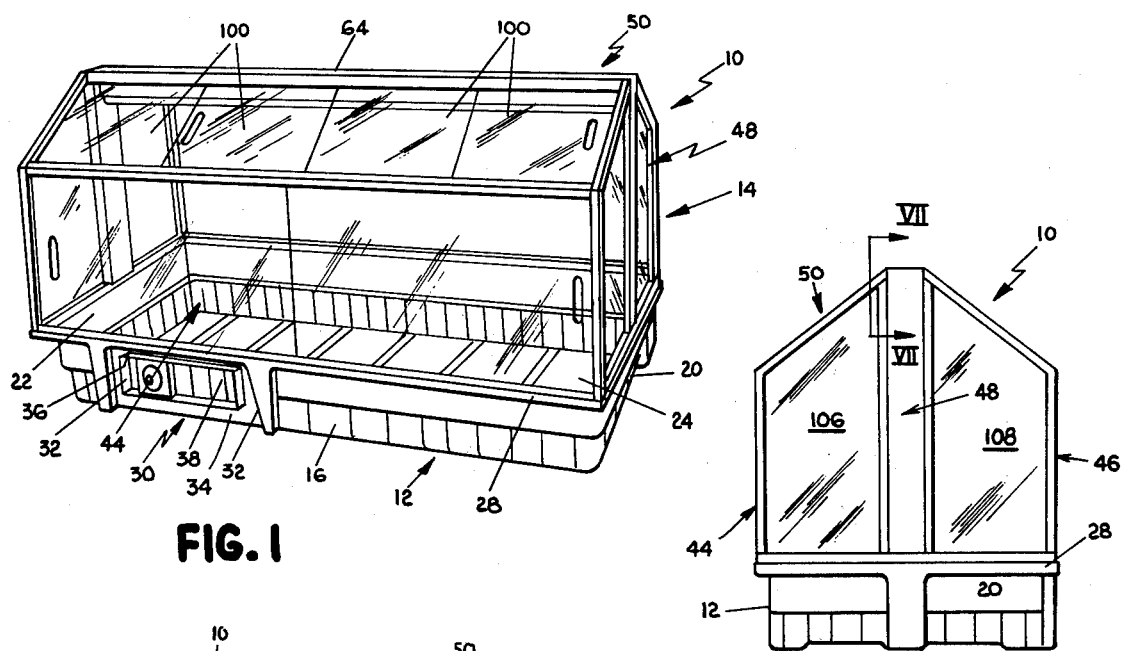
FIG. 1
FIG. 2
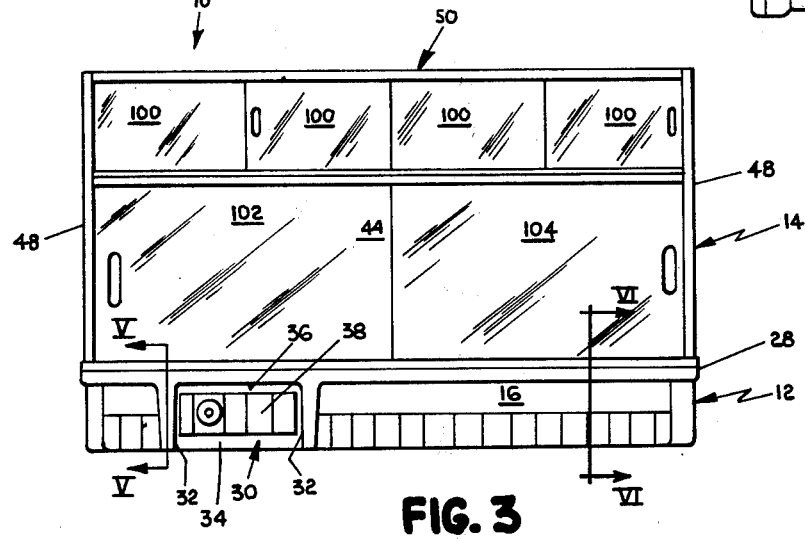
FIG. 3
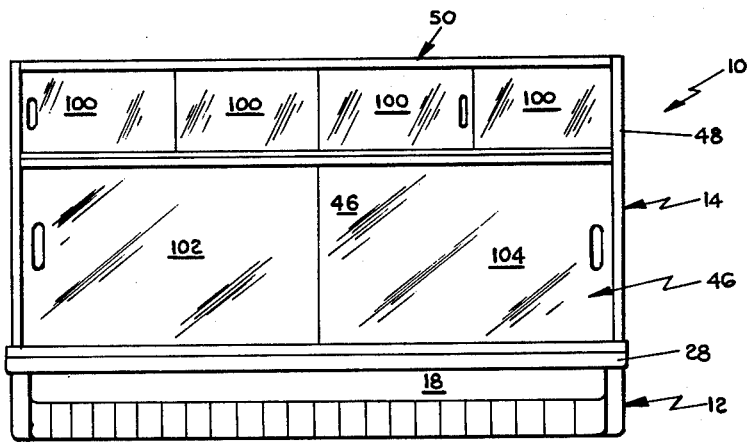
FIG. 4

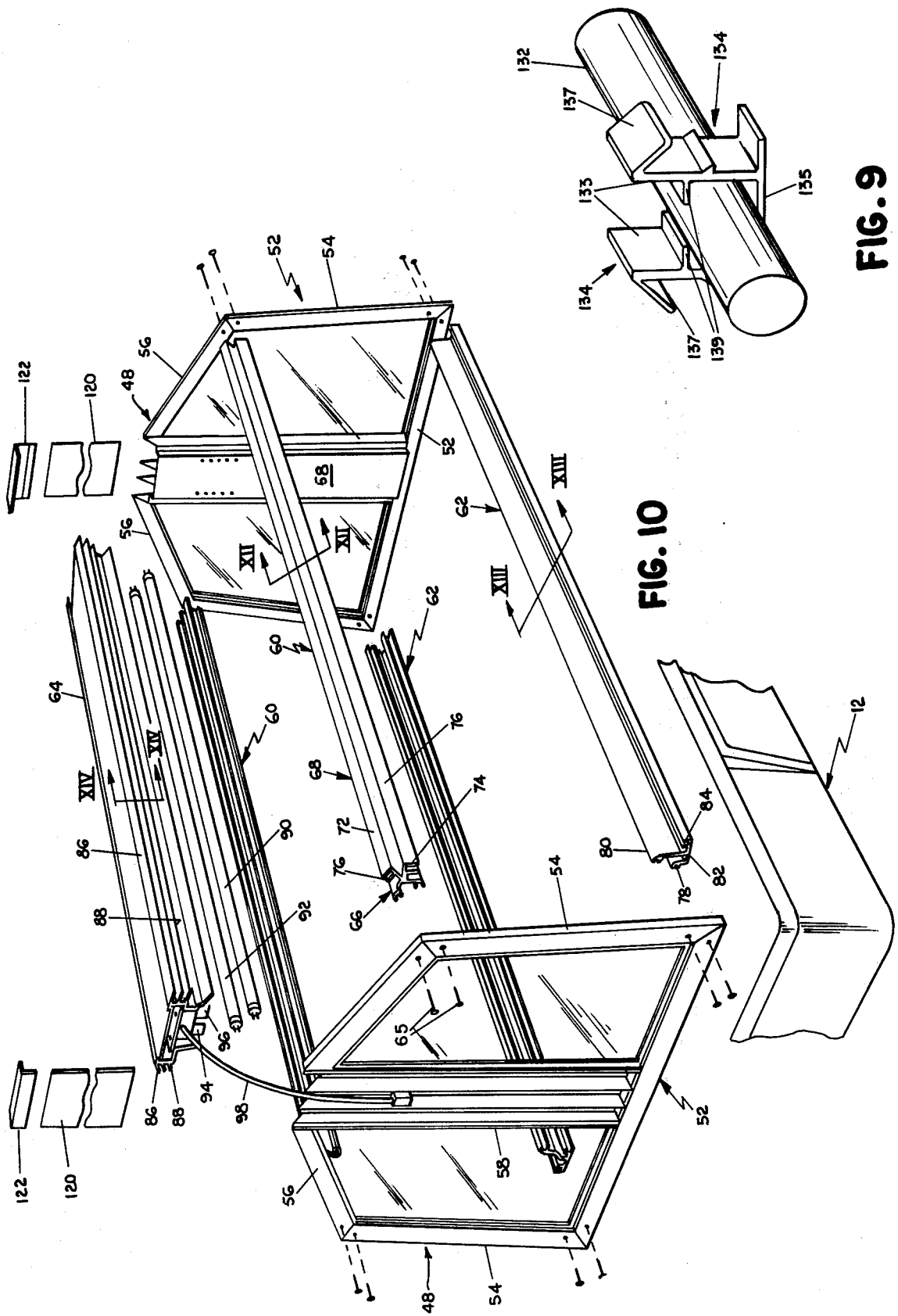

PORTABLE GREENHOUSE

BACKGROUND OF THE INVENTION

This invention relates to enclosures for growing plants, and more particularly, to a portable, self-contained greenhouse.

Various forms of small, greenhouse-like structures are presently available for use in homes, offices, and other such surroundings. These structures are employed to facilitate the growing of plants and for seed germination prior to planting in an outdoor garden. Also, due to the weather conditions experienced in many geographical areas, people are unable to raise out of doors many of the tropical of more exotic type plants. These plants require a relatively high moisture content in the atmosphere and soil as well as relatively warm temperatures.

The small portable greenhouses that have been proposed in an attempt to provide a fairly controlled atmosphere within which the common variety of house plants as well as the more exotic tropical varieties may be successfully grown are exemplified by U.S. Pat. No. 2,963,819 to E.T. Hoch, entitled PORTABLE GREENHOUSE and issued on Dec. 13, 1960. This patent discloses a portable greenhouse arrangement including a base, upstanding side panels, front and rear walls and a roof structure including slidable, transparent panels. An incandescent or fluorescent light is provided for artificial stimulation of plants within the greenhouse. Further, heater tape is stapled to a Masonite board which is disposed within the base to provide heat for plant growth. No provision is made to ensure an adequate supply of water in order to maintain the moisture level required for proper plant growth and seed germination. Further, the artificial lighting system must be manually actuated for artificial stimulation.

Although serving to provide an enclosure whereby fairly stable atmospheric and soil conditions may be maintained, the portable greenhouses of the type exemplified in the Hoch patent require fairly constant attention and monitoring on the part of the user.

The need exists, therefore, for a portable greenhouse structure which is simple in overall structural arrangement, easily manufactured, but which includes provision for fairly automatic operation without the need for constant attention on the part of the user. Such a portable greenhouse should be capable of maintaining the soil within which the plants grow at the desired temperature for the particular types of plants involved. The greenhouse should also have the capability of providing artificial stimulation of the plants as a function of ambient lighting as well as provide an indication of the moisture content of the soil. These features should be incorporated in a structure which is not so complex as to present reliability problems and as to result in high manufacturing costs. It is also of utmost importance to provide easy access to the confines of the enclosure for planting, removal, and treatment of the plants. The manner in which the enclosure is heated and the manner in which artificial lighting is provided must be such as to reduce any possibility of accidental injury to the user of the greenhouse.

SUMMARY OF THE INVENTION

In accordance with the present invention, a simple, easily manufactured enclosure is provided whereby a wide variety of available household plants, tropical plants and other more exotic plants may be successfully grown in an indoor setting. Essentially, the portable greenhouse in accordance with the present invention includes a base pan within which the soil mixture is disposed. The base pan includes longitudinally extending troughs adjacent the sides thereof for collecting excess water which is eventually wicked back up into the soil mixture. A transparent enclosure is supported on the base pan and includes end panels, transparent wall members and means for slidably mounting the transparent wall members between the end panels. Provision is made for automatically heating the soil disposed within the base pan. Also, provision is made for artificially stimulating the plants placed within the soil mixture as a function of ambient light and for indicating the moisture contenct of the soil mixture.

BRIEF DESCRIPTION OF THE DRAWINGS

FIG. 1 is a perspective view of a portable greenhouse in accordance with the present invention;

FIG. 2 is a side elevational view of the greenhouse of FIG. 1;

FIG. 3 is a front elevational view;

FIG. 4 is a rear elevational view;

FIG. 8b is a side elevational view of the heater of FIG. 8a;

FIG. 9 is an enlarged fragmentary, perspective view illustrating a clip for retaining the heating element;

FIG. 10 is a perspective, fragmentary exploded view showing the manner of assembly of the transparent enclosure incorporated in the greenhouse of the present invention;

DETAILED DESCRIPTION OF THE PREFERRED EMBODIMENT

With reference to the drawings, FIGS. 1-4 illustrate the improved portable, self-contained greenhouse in accordance with the present invention and generally designated 10. The greenhouse 10 includes a base pan 12 for containing a soil mixture and upon which is supported a transparent enclosure 14.

Figure 5:
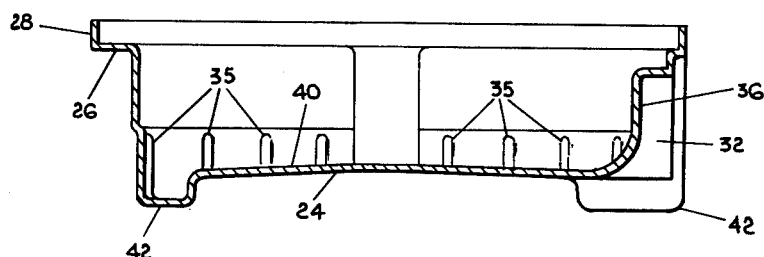
FIG. 5 is a cross-sectional, elevational view of the base pan of the greenhouse taken generally along line V—V of FIG. 3.
Figure 6:
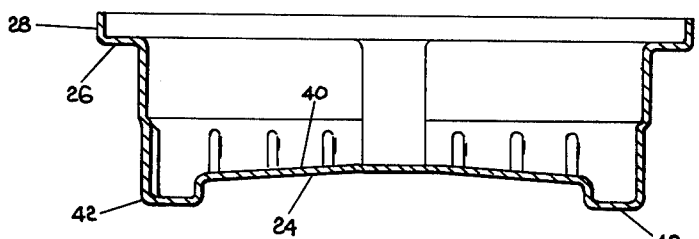
FIG. 6 is a cross-sectional, elevational view of the base pan taken generally along line VI—VI of FIG. 3.

The base pan 12 includes generally vertical, front and rear walls 16, 18, side walls 20, 22 and a bottom wall 24. As best seen in FIGS. 5 and 6, the upper peripheral edge of the base pan 12 is formed with an outwardly extending peripheral shoulder 26 terminating in an upwardly extending peripheral skirt or lip 28. The shoulder 26 and skirt 28 are dimensioned so as to removably receive and support the transparent enclosure assembly 14. The front wall 16 of the base pan 12 is formed with a control module housing 30 having side walls 32, a rear wall 34, and a ceiling portion 36. The housing 30 is dimensioned so as to receive and house a modular control system having an operator control panel 38. The control system incorporated in the present invention will be more fully described below with reference to FIG. 11. Each of the walls of the base pan may be ribbed as at 35 to increase the structural rigidity of the pan.

The bottom panel or wall 24 of the base 12 has a generally flattened, U-shaped cross section. The bottom wall includes a curved intermediate, longitudinally extending portion 40 and a pair of longitudinally extending, trough-like portions 42. By curving intermediate portion 40, excess water in the pan will drain to the troughs 42. The troughs serve to collect and retain excess water which will subsequently return to the soil mixture in the pan by capillary action. The base pan may be formed by conventional molding techniques from plastic materials, preferably sturdy ABS plastic.

As is apparent from FIGS. 1-4, the transparent enclosure assembly 14 of the present invention includes front and rear walls 44, 46, side walls or panels 48 and a roof structure 50. The front and rear walls and the roof structure are defined by frame members which slidably mount glass or other transparent panels.

As best seen in FIG. 10, each side or end panel 48 is defined by a frame having a base member 52, upstanding sides 54, top members 56, and a central rail or middle channel member 58. The side panels 48 are interconnected by longitudinally extending upper and lower struts 60, 62 and a central strut or ridge piece 64. All of the frame members are interconnected by suitable fasteners such as machine screws 65. The frame members are preferably extruded items formed from lightweight, corrosion-resistant material such as aluminum.

Figure 12:
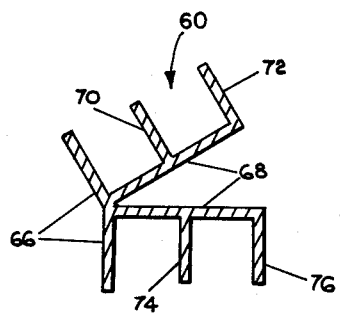
FIG. 12 is a cross-sectional view taken along line XII—XII of FIG. 10.

As seen in FIG. 12, the upper strut 60 is in the form of a multi-channeled member having a lower, inwardly directed, V-shaped portion 66 and an upper, outwardly directed, V-shaped portion 68. These portions 66 and 68 are angled so as to mate with the corner defined by the side members 56 and 54. Further, the legs of the portion 68 include outwardly directed, perpendicular flanges 70, 72, 74 and 76. These flanges define glass-receiving channels or tracks.

Figure 13:
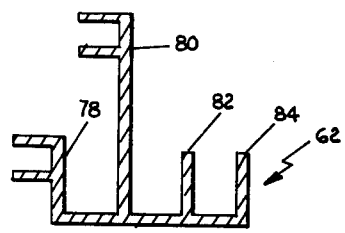
FIG. 13 is a cross-sectional view taken along line XIII—XIII of FIG. 10.
Figure 14:
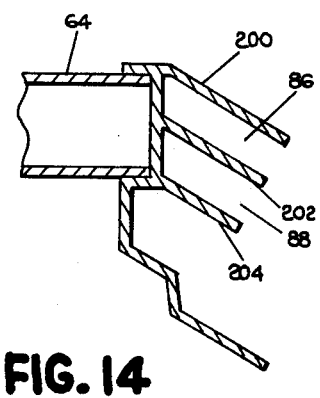
FIG. 14 is a cross-sectional view taken along line XIV—XIV of FIG. 10.

As seen in FIG. 13, the lower strut 62 is in the form of a horizontally disposed longitudinally extending channel member having upstanding walls 78, 80, 82 and 84. The walls 80, 82, and 84 define a pair of glass-receiving channels or tracks which are in line with the glass-receiving channels of the upper strut 60. The walls 78 and 80 also serve as attachment points to the side panels (FIG. 10).

Figure 7:
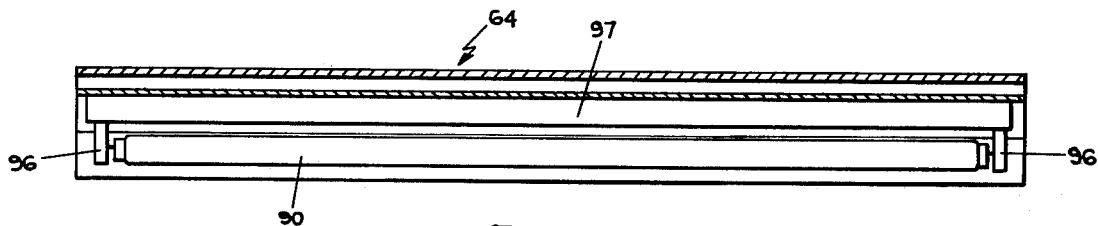
FIG. 7 is a cross-sectional, elevational view taken generally along line VII—VII of FIG. 2.

The center strut or ridge piece 64 includes, along the lateral edges thereof, a pair of angled, glass-receiving tracks 86 and 88 defined by flanges 200, 202, 204. These tracks are angled so as to lie in the same plane as the upper tracks of the strut 60. The undersurface of the ridge piece supports a pair of fluorescent lights 90, 92. The fluorescent lights are mounted in light receptacles 94, 96 of bracket 97 (FIG. 7). Wires 98 lead from the light receptacles and extend downwardly within the middle channel of the central rail 58 of the side panels.

Once the frame members of the top enclosure have been assembled, a plurality of glass or other transparent panels are inserted within and slidably supported by the various tracks or channels. This is best seen in FIGS. 1-4 wherein the enclosure includes four rectangular transparent panels 100 forming each side of the roof structure. A pair of glass panels 102, 104 are supported by the upper strut 60 and the lower strut 62 on each side of the enclosure to form the front and rear walls. Finally, non-slidable glass or transparent plates 106, 108 are supported by the end panels or frames to complete the enclosure.

The panels 102, 104 are dimensioned so that their upper edges may first be inserted into the channels of the upper strut 60, pushed upwardly to clear the lower strut 62, and then dropped into the corresponding channels of the lower strut 62. The panels 100 of the roof structure are similarly dimensioned so that they may be easily inserted within the channels 86, 88 of the ridge piece 64 and the corresponding upper channels of strut 60. The transparent panels are preferably formed from automotive-type, tempered safety glass.

By providing multiple, sliding glass panels as the wall and roof structure of the enclosure, access to the interior of the enclosure is readily obtainable. The user of the greenhouse may obtain access from either the front or rear walls or from virtually any position along the top or roof structure.

Once the glass panels are installed and the electrical connection to the lights has been made, a pair of accent strips 120 cover the open face of the central rails 58 and the ends of the center strut 64 are covered by suitable end caps 122 (FIG. 10).

Figure 8A:
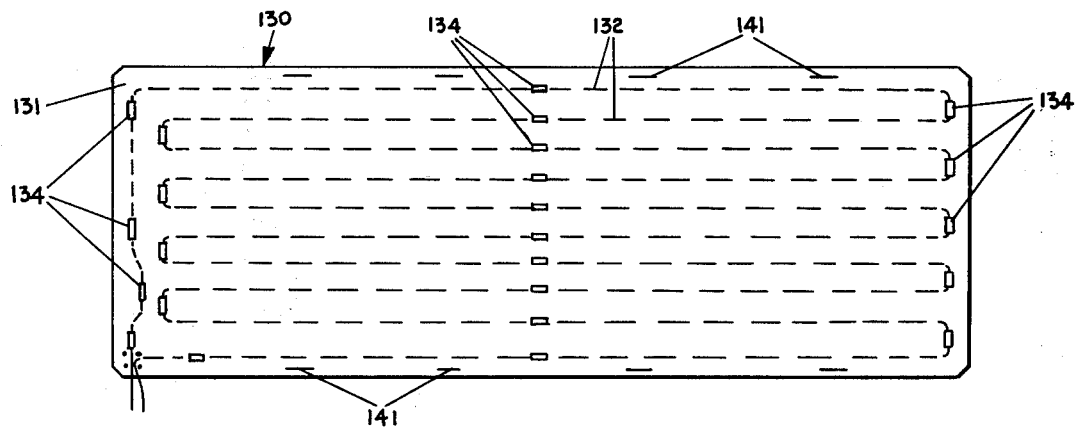
FIG. 8a is a plan view of the heater incorporated in the portable greenhouse.
Figure 8B:
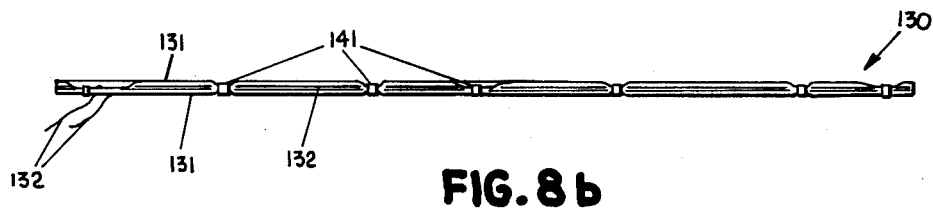

The heating arrangement to be employed with the greenhouse is illustrated in FIG. 8a, 8b and 9 and generally designated 130. As shown therein, the heater includes a pair of generally metal, heat spreading shields or plates 131.

Sandwiched between the superimposed shields or plates 131 is a resistance heater wire 132. Rigid clips 134 secure the wire between the plates 131. The clips, as best seen in FIG. 9, are generally U-shaped, and include legs 133, a base 135 which extends beyond each leg 133 and outwardly extending downwardly angled tabs 137. A pair of opposed, horizontal wire retaining tabs 139 extend from the inner surfaces of the legs 133.

The clips 134 are inserted through suitable apertures in one of the plates 131 with the legs extending upwardly. The heater wire 132 is then inserted within the clips and retained by retaining tabs 139. The clips separate the wire from itself and position the wire between the plates in a meandering or serpentine fashion as seen in FIG. 8a. The remaining plate also having suitable apertures is superimposed on the first plate. The legs 133 are pressed through the apertures and the tabs 137 hold the plates together. Also, a plurality of staples 141 may be used around the periphery of the heater to fasten the plates together.

The heater wire 132 may be a conventional readily available, 100 watt silicon resistance wire. It is preferred that the clips be formed from a heat resistant, somewhat resilient material such as a rigid vinyl plastic to increase the ease of assembly of the heater.

The plates 131 which are preferably aluminum dissipate heat and thereby evenly transfer heat to the soil mixture within the pan. As a result, localized "hot spots" which would attract growing plant roots and subsequently kill the plants are eliminated. Further, as a safety measure, the superimposed plate construction acts as a shield and prevents a user of the greenhouse from coming into contact with the heater wire. Such contact could occur when a user is working the soil with small garden tools. The wire is almost totally enclosed and the clips prevent short circuiting. Preferably the wire contacts the plates between the clips. This maximizes heat transfer and distribution throughout the soil mixture.

In a typical arrangement, the trough sections of the pan are filled with a layer of vermiculite. Suitably dimensioned fiberglass 16-18 or 18-18 mesh sheets are placed over the trough areas to prevent silt from leaching down and filling up the troughs. A mixture of peat, sand and vermiculite is then placed within the pan. The heating arrangement is placed with the wire down on this layer and the pan is then filled with additional soil mixture.

Figure 11A:
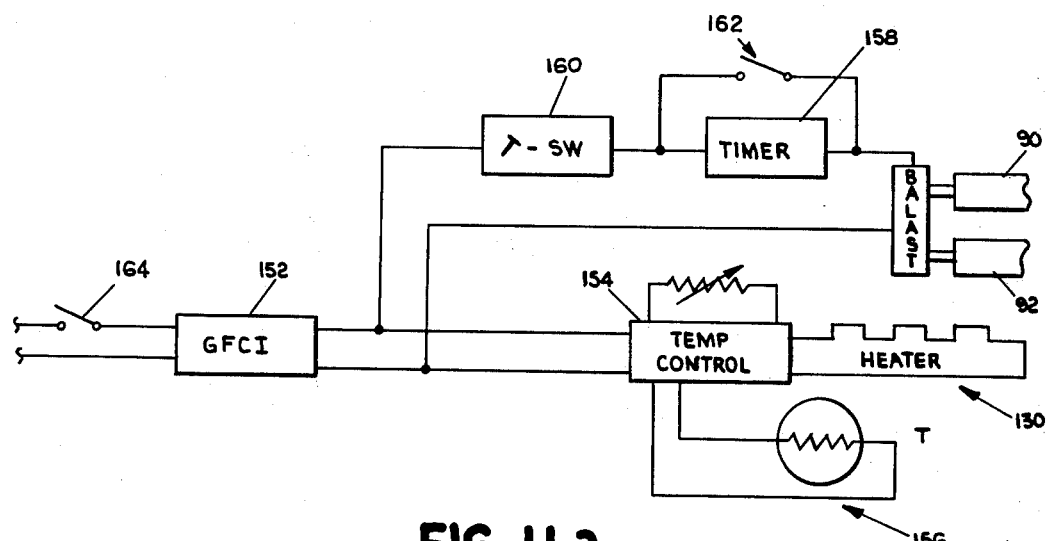
FIGS. 11A and 11B are schematic illustrations of the control system incorporated in the greenhouse of the present invention.

The fluorescent lights and the heating arrangement form the major portions of the environmental control system employed with the present invention. Most plants require light 12 to 14 hours a day, plus the proper amount of heat and moisture for maximum growth. As previously set forth, natural conditions in most geographical areas do not provide these optimum conditions, especially on a year long basis. As schematically illustrated in FIG. 11A, a system for controlling the temperature and the lighting within the greenhouse includes a ground fault circuit interrupter 152, a variable resistance temperature control 154, a temperature sensor 156, a twenty-four hour clock timer 158 and a photocell interrupt system 160. As shown, the ground fault circuit interrupter is connected to a suitable source of power such as 120 volt, 60 hertz power supply. Current is supplied to the fluorescent lights through the photocell interrupt and the twenty-four hour clock timer. A manual bypass switch 162 is provided around the timer for manual operation of the lights. Also, current is supplied through the temperature control 154 to the heater assembly. The temperature sensor 156, which may be of the variable resistance type, is deposited in the soil mixture within the pan above the heater. The sensor functions to activate or deactivate the heater through temperature control 154. The temperature control is of a conventional, solid state type and permits the user of the greenhouse to set the desired soil and therefore the greenhouse temperature is dependent upon the type of plants being grown.

The 24 hour clock timer 158 is employed to activate the fluorescent lights and thereby artificially stimulate the plants within the greenhouse. This timer is of a conventional type and may be used to stimulate the plants for up to a 24 hour day. The plants will absorb the light during this period with photosynthesis occurring during the dark period. The system artificially stimulates the plants thereby accelerating the growth process.

The photocell interrupt 160 includes a photocell sensor mounted on the control panel 38. The interrupt system preferably operates with a time delay of two to four minutes. This is accomplished with a suitable relay actuated by the photocell. As a result, the photocell must be exposed to sunlight or other exterior lighting source having an intensity greater than the artificial source for a period of two to four minutes prior to activation of the photocell interrupt relay. Once the relay is activated, the fluorescent lights are automatically shut off. Also, the delay prevents actuation of the lights in the event the ambient light is temporarily blocked from the photocell. This feature eliminates any hunting or alternating on/off action of the lights due to transient lighting conditions. In the preferred embodiment, the lights should provide an intensity of 650 candles at the soil bed.

The ground fault circuit interrupter is a conventional item and is preferably set to interrupt the supply of current to the heater and lights upon a 5 ma difference in current levels. The ground fault circuit interrupter is an extremely accurate circuit protector which exceeds the capabilities of a more conventional, fusible metal type circuit breaker. A master on/off switch 164 is placed in series with the interrupter and is mounted on the control panel 38. Also, a power "on" indicator light may be connected to the control circuit and mounted on the panel.

Figure 11B:
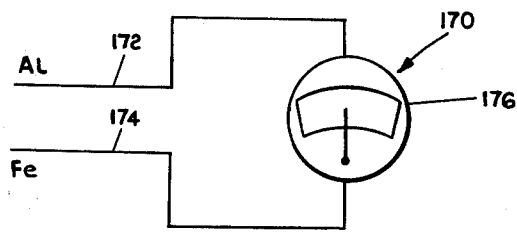

As previously set forth, the moisture level in the soil as well as the humidity within the atmosphere enclosed by the greenhouse should be maintained within fairly strict ranges dependent upon the type of plant or plants being grown. In order to provide an indication of the moisture content, a simple moisture probe 170 inserted into the soil mixture is employed (FIG. 11B). The moisture probe 170 includes electrodes 172 and 174 of dissimilar metals. It is preferred that the electrodes be formed of aluminum and iron, respectively. Each electrode is electrically connected to a galvanometer type meter 176. The meter 176 is mounted in the control panel 38. The moisture present within the soil and between the electrodes results in galvanic action thereby generating current. The current level is indicated by the meter. The moisture probe and meter measures the conductivity of the soil mixture. The output from the probe is a function of the soil moisture content and the specific contents of the soil mixture. Therefore, a given moisture indicator should be calibrated to indicate moisture levels in a predetermined soil mixture. Preferably, the mixture will comprise a mix of peat, sand and vermiculite. Once the desired percentages of each are selected, the indicator is precalibrated to indicate three moisture ranges: namely, wet moist and dry, the wet range being from 75 to 100 percent relative moisture content, the moist range being from 45 to 75 percent relative moisture content, and the dry range being from 0 to 45 percent relative moisture content. Since the meter is mounted on the front panel or wall of the greenhouse, the user is thereby readily informed of the moisture content and therefore of the need to add water to the soil. Other forms of moisture indicators could, of course, be employed. Due to the unique structural shape of the base pan, any excess water deposited in the soil will collect in the troughs 42. As the soil mixture dries out, the excess moisture will wick up into the mixture. It should be noted that the heater 130 does not totally cover the area of the pan. As a result, the water may be drawn up by capillary action around the heat shield to the plants and soil mixture.

These features substantially eliminate the occurrence of overwatering of the plants. The moisture indicator informs the user when water must be added and when a sufficient amount has been added. If excess water is added, the excess will drain to the troughs and be wicked up into the soil mixture as needed. If the user of the greenhouse is going to be away from the greenhouse location for a period such as a few days, the troughs, when filled, automatically dispense moisture into the soil. The overall system, therefore, substantially reduces the amount of attention required for proper plant growth and care.

OPERATION

The operation of the greenhouse will now be more fully described. After assembly of the transparent enclosure and filling of the base pan with soil in the manner set forth above, the control system is connected to a suitable source of power such as a 120 volt, 60 hertz, wall outlet. The temperature control is set to the desired temperature and the twenty-four hour clock timer is activated to provide the desired lighting period. Water is added to the soil mixture until the desired moisture content is indicated. The photocell interrupt will function to activate or deactivate the fluorescent lights as a function of ambient lighting conditions. The user of the greenhouse need only periodically check the moisture indicator and add water as needed to maintain the controlled environment within the greenhouse. If a short should develop in any of the components, the ground fault interrupter will sense the abnormal condition and automatically shut down the system.

It can, therefore, be seen that the portable, self-contained greenhouse in accordance with the present invention provides a simple, easily manufactured and readily maintainable enclosure for the controlled growing of a wide variety of plants. The automatic control system ensures a controlled environment within which the plants may grow at rates above those obtainable under natural conditions. Most any flower, spice, herb vegetable or other plant may be grown at accelerated rates within the greenhouse with minimum user attention. The only limiting factor is actually the mature plant size. Overall dimensions for the greenhouse of approximately four feet long by two feet wide by twenty-six inches high have been found acceptable for plants that users would most frequently desire to grow. The present invention substantially alleviates the problems heretofore found in prior art portable greenhouses. It is expressly intended, however, that the above description be considered as that of the preferred embodiment only. The true spirit and scope of the present invention will be determined by reference to the appended claims.

The embodiments of the invention in which an exclusive property or privilege is claimed are defined as follows.

1. A portable, self-contained greenhouse comprising:
a base pan adapted to receive a soil mixture;
a transparent enclosure supported on said base pan;
lighting means mounted to said enclosure for artificially stimulating the plant life growing in the soil mixture;
heating means positioned within said base pan and buried within the soil mixture for uniformly heating the soil mixture, said heating means including
a pair of superimposed heat spreading shields adapted to be placed within said base pan and buried within the soil mixture, said shields each having a plurality of spaced apertures arranged in vertically spaced pairs when said plates are superimposed;
a plurality of clips each extending through one of said pairs of vertically spaced apertures being generally U-shaped and including wire retaining tabs extending inwardly between the legs of the clip; and
a resistance type heating wire sandwiched between said shields and retained by said tabs between the legs of each of said clips in a serpentine manner, said wire contacting said heat shields at spaced points.

2. A portable, self-contained greenhouse comprising:
a base pan having longitudinally extending troughs adjacent the sides thereof and a curved bottom panel intermediate the troughs, said pan adapted to receive a soil mixture;
a transparent enclosure supported on said base pan, said enclosure including end panels, transparent wall members and means for slidably mounting said transparent wall members between said end panels;
heating means supported within said pan and buried within the soil mixture for uniformly heating the soil mixture;
sensing means for sensing the soil temperature and actuating said heating means;
lighting means supported by said enclosure for artificially stimulating the plants growing in the soil mixture;
lighting control means electrically connected to said lighting means for automatically activating said lighting means as a function of ambient light, and wherein said heating means includes;
a pair of superimposed heat spreading shields adapted to be placed within said base pan above the troughs and buried within the soil mixture, said shields each having a plurality of spaced apertures arranged in vertically spaced pairs when said plates are superimposed;
a plurality of clips each extending through one of said pairs of vertically spaced apertures being generally U-shaped and including wire retaining tabs extending inwardly between the legs of the clip;
a resistance type heating wire sandwiched between said shields and retained by said tabs between the legs of each of said clips in a serpentine manner, said wire contacting said heat shields at spaced points.

3. A portable, self-contained greenhouse as defined by claim 2 wherein said transparent enclosure further includes a transparent roof structure and wherein said lighting means includes a fluorescent light supported by said roof structure.

4. A portable, self-contained greenhouse as defined by claim 2 wherein said sensing means comprises:
a temperature sensor adapted to be disposed within the soil mixture; and
a temperature control means electrically connected to said temperature sensor and said heating wire for automatically actuating said heating wire to maintain a preselected soil temperature.

5. A portable, self-contained greenhouse as defined by claim 4 wherein said lighting control means includes a 24 hour clock timer electrically connected to said light means.

6. A portable, self-contained greenhouse as defined by claim 5 wherein said lighting control means further includes a photocell interrupt means electrically connected to said clock timer, said photocell interrupt means including a photocell ambient light sensor connected to a time delay relay for interrupting or activating said lighting means as a function of ambient lighting.

7. A portable, self-contained greenhouse as defined by claim 5 wherein said lighting control means further includes a manual bypass switch connected around said clock timer.

8. A portable, self-contained greenhouse as defined by claim 7 further including means disposed partially within the soil within said pan for indicating the relative moisture content of said soil mixture.

9. A portable, self-contained greenhouse as defined by claim 8 wherein said moisture indicating means comprises:
a pair of electrodes of dissimilar metals adapted to be disposed in the soil mixture, each of said electrodes electrically connected to a meter mounted on one side of said base pan, said meter being calibrated to indicate wet, moist and dry soil conditions.

10. A portable, self-contained greenhouse as defined by claim 8 further including a ground fault circuit interrupter adapted to be connected to a source of power, said ground fault circuit interrupter being electrically connected to said temperature control means and said photocell interrupt means.

11. A portable, self-contained greenhouse as defined by claim 10 wherein said means for slidably mounting said transparent wall members includes a lower strut extending between said end panels, said lower strut including a pair of panel receiving tracks; and an upper strut extending between said end panels and vertically spaced from said lower strut, said upper strut having a pair of panel-receiving tracks positioned in the same plane as said tracks of said lower strut whereby said transparent panels may be supported within said tracks for slidable movement.

12. A portable, self-contained greenhouse as defined by claim 11 wherein said means for mounting said roof panels includes said upper strut further including a second pair of panel-receiving tracks; and a central ridge piece extending between said end panels, said ridge piece including a pair of panel-receiving tracks along a lateral edge thereof, said ridge piece tracks being in the same plane as said upper strut second pair of panel-receiving tracks.

13. A portable, self-contained greenhouse as defined by claim 11 wherein the side walls of said base pan include a plurality of spaced, vertically extending reinforcing ribs.

14. A portable self-contained greenhouse as defined by claim 2 wherein said means for slidably mounting said transparent wall members includes a lower strut extending between said end panels, said lower strut including a pair of panel-receiving tracks; and an upper strut extending between said end panels and vertically spaced from said lower strut, said upper strut having a pair of panel-receiving tracks positioned in the same plane as said tracks of said lower strut whereby said transparent panels may be supported within said tracks for slidable movement.

15. A portable, self-contained greenhouse as defined by claim 14 wherein said transparent enclosure further includes a transparent roof structure having a plurality of roof panels and means for slidably mounting said roof panels and wherein said means for mounting said roof panels include said upper strut further having a second pair of panel-receiving tracks; and a central ridge piece extending between said end panels, said ridge piece including a pair of panel-receiving tracks along a lateral edge thereof, said ridge piece tracks being in the same plane as said upper strut, second pair of panel-receiving tracks.

16. A portable, self-contained greenhouse as defined by claim 15 wherein said base pan includes a plurality of spaced, vertically extending ribs.

* * * * *

UNITED STATES PATENT AND TRADEMARK OFFICE
CERTIFICATE OF CORRECTION

PATENT NO. : 4,051,626
DATED : October 4, 1977
INVENTOR(S) : Richard L. Trumley and Randy W. Linn It is certified that error appears in the above–identified patent and that said Letters Patent are hereby corrected as shown below:

Column 1, line 15

"of" should be --or--

Column 4, line 28

"Fig." should be --Figs.--

Column 8, line 56

"5" should be --6--

Signed and Sealed this

Sixteenth Day of May 1978

[SEAL]

Attest:

RUTH C. MASON
Attesting Officer

LUTRELLE F. PARKER
Acting Commissioner of Patents and Trademarks